Figure 4:
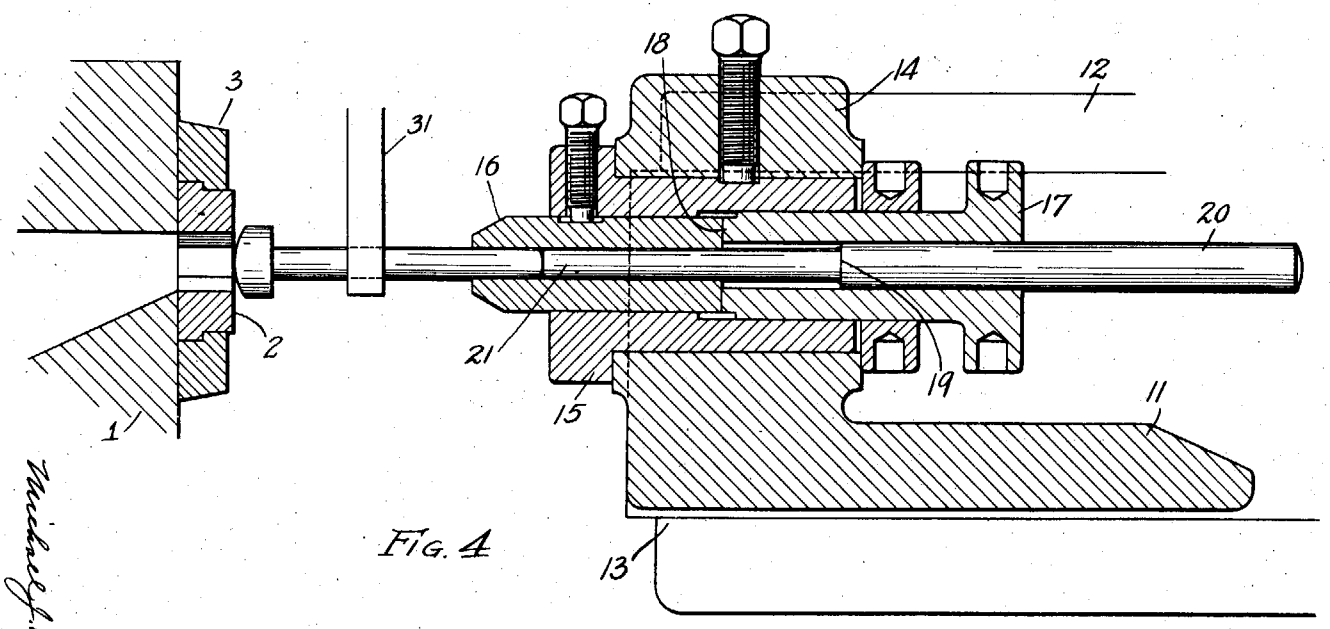

Jan. 4, 1927. M. J. RILEY Re. 16,522
MACHINE FOR TRIMMING BLANKS OF BOLTS, NUTS, SCREWS, AND THE LIKE
Original Filed April 4, 1921 2 Sheets-Sheet 1
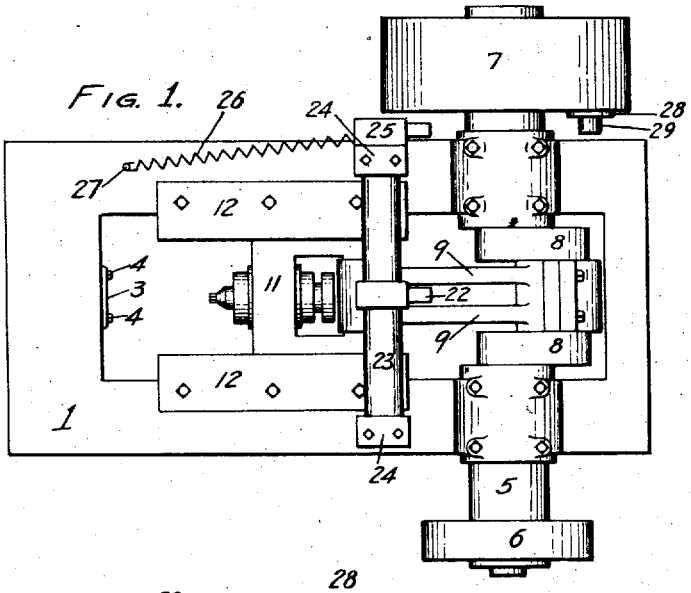
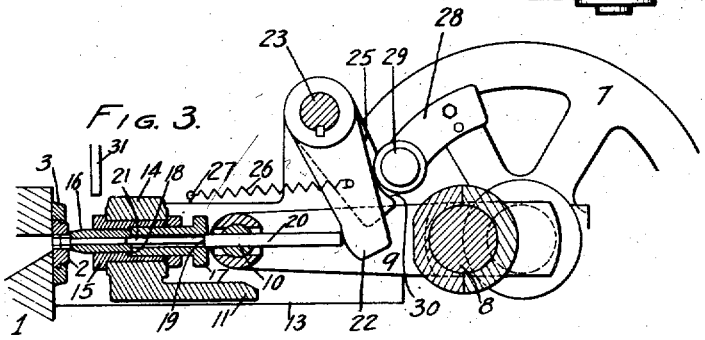
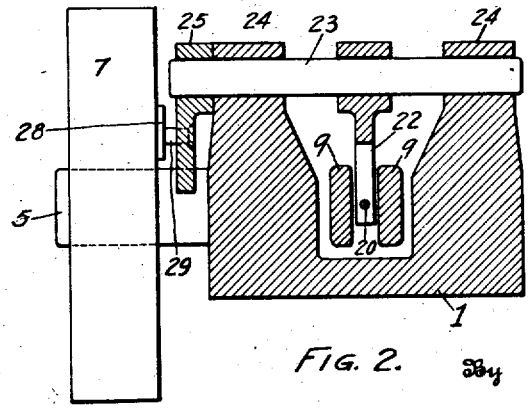
FIG. 2.
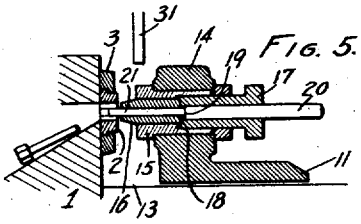
Inventor
Michael J. Riley
By Harry R. Williams
Attorney Jan. 4, 1927. Re. 16,522

M. J. RILEY

MACHINE FOR TRIMMING BLANKS OF BOLTS, NUTS, SCREWS, AND THE LIKE

Original Filed April 4, 1921 2 Sheets-Sheet 2

Inventor

Michael J. Riley

By Harry R. Williams

Attorney

Reissued Jan. 4, 1927.

Re. 16,522

UNITED STATES PATENT OFFICE.

MICHAEL J. RILEY, OF EAST CLEVELAND, OHIO, ASSIGNOR TO THE E. J. MANVILLE MACHINE COMPANY, OF WATERBURY, CONNECTICUT, A CORPORATION OF CONNECTICUT.

MACHINE FOR TRIMMING BLANKS OF BOLTS, NUTS, SCREWS, AND THE LIKE.

Original No. 1,479,835, dated January 8, 1924. Serial No. 458,344, filed April 4, 1921. Application for reissue filed July 21, 1926. Serial No. 124,078.

The invention relates to machines which will cut blanks for bolts, nuts, screws or the like so as to change either their shape or size. One object is to form the square, hexagonal or other shaped heads of bolts, the trimming and sizing of nut blanks, the cutting of two flat sides on a round head to form shackle bolts, the trimming of round screw heads to accurate size and many other similar operations.

One of the objects of the invention is to provide a machine which will trim a blank quickly and efficiently without tearing the metal so as to produce at a single operation and in a minimum of time a product with a superior finish on the cut surface.

In the accompanying drawings is shown one specific form the invention may take. Fig. 1 is a plan view of the machine; Fig. 2 is a transverse vertical section; Fig. 3 is a longitudinal vertical section; Fig. 4 is a fragmentary longitudinal vertical section similar to Fig. 3 but showing the parts in another position; Fig. 5 is a fragmentary longitudinal vertical section similar to Fig. 4 but showing the parts in another position.

The frame 1 of the machine is more or less rectangular in form and at one end is provided with a die 2 which is hollow and of the shape to substantially correspond with the desired shape of the trimmed blank. The die 2 is shown mounted in a plate 3 fastened by cap 4 to the frame 1, and directly back of the opening in the die the frame is open.

At the opposite end of the frame a transverse shaft 5 is provided with a driving pulley 6 and fly wheel 7. Centrally of the shaft and within the frame 1 is a crank or eccentric 8 carrying a pair of arms 9 pivoted at 10 to a gate 11 held down by gibs 12 so as to slide in ways 13 in frame 1. Forward of the pivot point 10 the gate 11 has a front wall 14 in a hole in which is a bushing 15 in which rests a hollow punch 16 against a hollow sleeve 17. The punch 16 projects forwardly from the wall 14 and the sleeve projects rearwardly therefrom. The hole in the punch 16 is somewhat smaller than the hole in the sleeve 17, forming a shoulder 18 which may engage a shoulder 19 on a pusher rod 20 which has a reduced portion 21 entering the hollow in the punch 16.

The rear end of the pusher rod 20 is engaged by a lever 22 keyed to a transverse shaft 23 from which it depends between the arms 9. The transverse shaft 23 is mounted in bearings 24 rising from the frame 1 between the gate and the shaft 5. The lever 22 is mounted between the bearings 24 and at the projecting end of the shaft 23 toward the fly wheel 7 is keyed a lever arm 25 which is engaged by a spring 26 tied at 27 to the frame 1. The spring 26 tends to cause the arm 22 to engage the end of the rod 20. A plate 28 on the fly wheel 6 carries a projecting pin or roller 29 which as the fly wheel 7 rotates engages a curved seat 30 in the arm 25 so as to cause the arm 22 to force the rod 20 to the left as indicated in Fig. 5.

Any suitable means may be provided for delivering rough headed blanks to the device and since such means are well known they are not shown here in detail but I have indicated at 31 the position picker fingers may take in delivering blanks to the machine.

As the shaft 5 rotates it will cause the gate 11 to reciprocate and if picker fingers 31 present a blank as shown in Fig. 4 the hollow punch 16 will advance to surround and support the shank of the blank. At the forward end of the movement of the gate after the picker fingers 31 have withdrawn, the punch 16 will press under the head of the blanks and force the head into the trimming die 2 to substantially the position shown in Fig. 3, in which position most but not all of the head is within and has been trimmed by the die. At this instant or just as gate 11 begins to recede with the punch 16 the rotation of the fly wheel 7 will bring the roller 29 into engagement with the arm 25 so as to cause the arm 22 to, through the push rod 20, press or strike a blow upon the end of the shank of the bolt as shown in Fig. 3 and so force the bolt head first further into and then through the die 2 as indicated in Fig. 5, thus completing the trimming. The blank will then fall out through the aperture in the frame 1 and as the punch 16 is further retracted on the gate 11 the shoulder 18 will engage the shoulder 19 on the pusher rod 20 and retract the rod to substantially the position shown in Fig. 4 so as to allow room for the entrance of a new blank to be operated on.

It will be noted that the head is trimmed by substantially a single cut, the punch stroke which causes the major part of the trimming of the head, and the pusher rod stroke which completes the trimming, being practically continuous, and since none of the excess metal is broken off there will be no roughness but a fairly highly polished surface produced at the sides of the head of the blank.

I claim as my invention:—

1. In a machine of the class described, a stationary die, a relatively movable oppositely disposed punch, a hole in the punch to receive the shank of a blank, a gate supporting the punch, means to reciprocate the gate to move the punch, a pusher rod in the hole in said punch, and on the gate, and movable relatively thereto toward and away from the die, and means to reciprocate the pusher rod independently of the motion of the gate.

2. In a machine of the class described, a stationary die, a relatively movable oppositely disposed punch, a hole in the punch to receive the shank of a blank, a gate supporting the punch, means to reciprocate the gate to move the punch, a pusher rod in the hole in said punch and on the gate and movable relatively thereto toward and away from the die, and means to move the pusher rod toward the die independently of the movement of the gate.

3. In a machine of the class described, a stationary die, a movable punch cooperating with the die, a movable gate supporting the punch, said punch having a hole to receive the shank of a blank, a pusher rod in such hole in said punch and on the gate and movable relatively thereto, means to move the gate toward and away from the die, and means to move the pusher rod toward the die independently of the motion of the gate.

4. A fixed die, a gate reciprocating toward and from the die, a hollow punch on the gate adapted to receive the shank of a blank and force the head of the blank into the die, a pusher rod in the punch engaging the shank of the blank, and means to move the pusher rod independently of the punch to force the blank through the die.

5. A fixed die, a gate reciprocating toward and from the die, a hollow punch on the gate adapted to receive the shank of a blank and force the head of the blank into the die, a pusher rod on the gate and moving independently thereof and extending into the punch for engaging the shank of the blank, and means to move the pusher rod independently of the punch to force the blank through the die.

6. A fixed die, a gate reciprocating toward and from the die, a hollow punch on the gate adapted to receive the shank of a blank and force the head of the blank into the die, a pusher rod in the punch for engaging the shank of the blank, a shaft, an arm on the shaft engaging the pusher rod, a second arm on the shaft, a rotating member engaging the second arm at one point in its rotation to move the pusher rod to force the blank through the die.

7. In a machine of the class described, a reciprocating hollow punch to receive the shank of a blank, a pusher rod in the punch engaged by the punch in its movement in one direction, and means independent of the punch to force the pusher rod in the other direction.

MICHAEL J. RILEY.